Nov. 16, 1965    R. H. W. KROEKEL    3,218,024
FLUID MOTOR ACTUATED BALL VALVE
Filed July 18, 1962    2 Sheets-Sheet 1

INVENTOR.
ROLF HEINZ WERNER KROEKEL
BY
William Frederick Werner
ATTORNEY

INVENTOR.
ROLF HEINZ WERNER KROEKEL
BY
William Frederick Werner
ATTORNEY

United States Patent Office 3,218,024
Patented Nov. 16, 1965

3,218,024
FLUID MOTOR ACTUATED BALL VALVE
Rolf Heinz Werner Kroekel, Coventry, R.I., assignor to Sealol, Inc., Warwick, R.I., a corporation of Delaware
Filed July 18, 1962, Ser. No. 210,667
3 Claims. (Cl. 251—58)

This invention relates to a ball valve and more particularly to a ball valve having novel actuating means and novel seating means.

It is an object of the present invention to provide a ball valve with actuating means for opening the valve with preselected speed.

It is another object of the present invention to provide a fluid actuated valve of pre-selected rapid opening and pre-selected rapid closing characteristics with means to cushion the end of both the opening and closing cycles.

It is still another object of the present invention to provide a ball valve with a self regulating captively held resilient sealing ring seat.

It is a further object of the present invention to provide a valve with a ring valve seat means for effecting a pre-selected sealing pressure against a ball valve.

And still another object of the present invention is to provide a ball valve which will efficiently function at exceedingly high pressures and at exceedingly low temperatures.

A further object of the present invention is to support the ball valve at each end of the vertical axis by means of anti-friction bearings and to provide means for adjusting the ball valve in a vertical direction.

And still a further object of the present invention is to provide a pressure-balanced bellows seal which maintains a constant, controlled face load on the ball regardless of operating pressures or line surges whereby the lowest possible torque and high-speed operation are achieved under varied pressure and temperature conditions.

Another object of the present invention is to provide an unrestricted channel or flow path through the valve in open position.

Other objects of the present invention will become apparent in part and be pointed out in part in the following specification and claims.

Like reference characters refer to like parts in the following drawings, in which.

Figure 1:
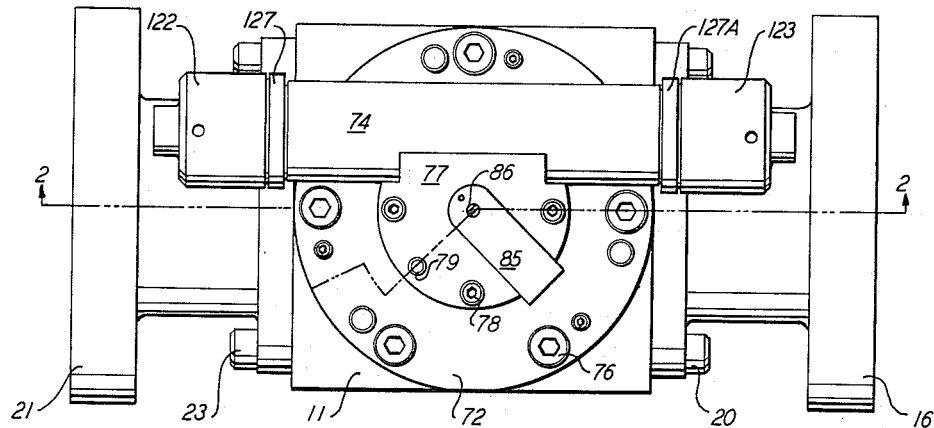
FIGURE 1 is a plan view of the new and improved ball valve.
Figure 2:
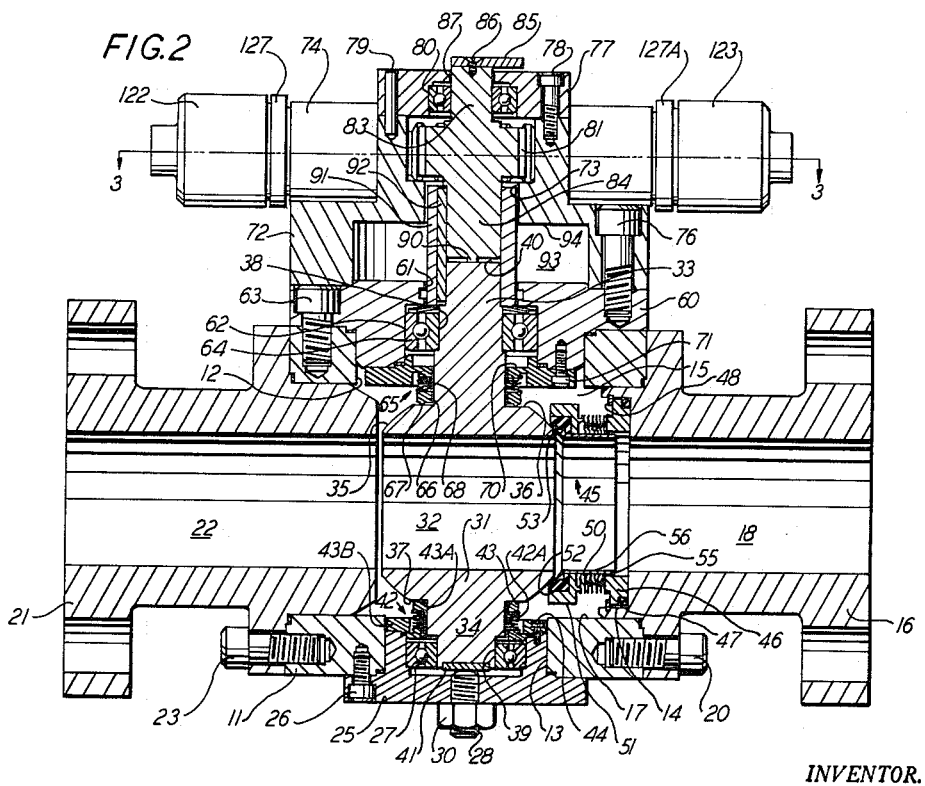
FIGURE 2 is a vertical sectional view taken on line 2–2 of FIGURE 1.

With reference to the drawing, a housing 11 is provided with an upper 12 and lower 13 vertical bore and with a horizontal bore 14. A chamber 15 is thus provided. A sealing flange 16 is provided with a circular recess 17 and in inlet flow aperture 18. Bolts 20 fasten sealing flange 16 to housing 11. A second flange 21 provided with an outlet flow aperture 22 projects part way into chamber 15 and is fastened to housing 11 by means of bolts 23. An adjusting cap 25 is located in lower vertical bore 13 and is fastened to housing 11 by means of bolts 26. Adjusting cap 25 is adapted to house a bearing 27, illustrated as a ball bearing. A ball valve adjusting screw 28 is rotatively mounted in adjusting cap 25 and is provided with a lock nut 30.

A ball valve 31 having a fluid passageway 32 is provided with an upper stem 33, a lower stem 34, a conical seat 35, an upper fluid sealing seat 36, a lower fluid sealing seat 37, an upper bearing surface 38, a lower bearing surface 39 and a top 40.

Lower bearing surface 39 is mounted to rotate in bearing 27. A wear plate 41 secured in the end of lower stem 34 engages and is supported upon ball valve adjusting screw 28. A bellows type motion transmitting mechanism, generally indicated by reference numeral 42, comprises a collar 43A provided with a lower circular projection 43, a washer 43B and an expansible bellows 42A secured on opposite ends to collar 43A and washer 43B, respectively. Collar 43A, expansible bellows 42A and washer 43B are slidably mounted upon lower stem 34 with lower circular projection 43 in fluid tight engagement with lower fluid sealing seat 37. Washer 43B is secured to adjusting cap 25 by means of screws 44. A second bellows type motion transmitting mechanism, generally indicated by reference numeral 45, comprises a collar 46 having a circular recess adapted to accommodate an "O" ring type packing 47 fluid seal. Collar 46 is secured in circular recess 17 by means of spring rings 48. One end of an expansible bellows 50 is fastened, as by welding, to collar 46. The other end of expansible bellows 50 is fastened, as by welding, to a collar 51 provided with a chamber 52. A resilient packing 53, such as neoprene or rubber is secured in chamber 52 and is adapted to engage and provide a fluid tight seal in cooperation with conical seat 35. Collar 46 is provided with a fluid passageway 54. A fluid shield 55 having a fluid passageway 56 is adapted to underlie expansible bellows 50 and to engage resilient packing 53.

A mounting plate 60 provided with an axial passageway 61 and a bearing area 62 is fastened to housing 11 by means of bolts 63. Upper stem 33 extends through axial passageway 61. A bearing 64, illustrated as a ball bearing, is secured to bearing area 62, by means of a drive fit and engages upper bearing surface 38 so that ball valve 31 through upper stem 33 is rotatively mounted in bearing 64.

A third bellows type motion transmitting mechanism, generally indicated by reference numeral 65, comprises a collar 66 having an upper circular projection 67. Collar 66 is fastened to one end of an expansible bellows 68 by means of welding. The other end of expansible bellows 68 is fastened, as by means of welding, to mounting ring 70 secured to mounting plate 60 by means of screws 71. Circular projection 67 engages fluid sealing seat 36 in fluid tight relationship.

An actuator housing 72 provided with a vertically stepped axial bore 73 is integrally provided with a horizontal tubular shaped member 74 having a horizontal bore 75 in communication with vertically stepped axial bore 73. Bolts 76 fasten actuator housing 72 to mounting plate 60. A bearing cap 77 is fastened to actuator housing 72 by means of screws 78 and dowel pins 79. A bearing 80, illustrated as a ball bearing, is located and secured in bearing cap 77.

A pinion 81 provided with teeth 82 and an upper stem 83 and a lower stem 84 is rotatively mounted in bearing 80 by means of upper stem 83. A pointer 85 is fastened to the end of upper stem 83 by means of a screw 86. Upper stem 83 projects through an axial passageway 87 in bearing cap 77. Lower stem 84 is provided with a central bearing point 90 which engages the top of upper stem 33. A sleeve 91 provided with a key 92 is slidably connected to upper stem 33 and lower stem 84 through key 92 whereby upper stem 33 is fastened to lower stem 84 to be driven thereby, as will presently appear.

It will be noted that a cavity 93 is formed between the top of mounting plate 60 and surface 94 of vertically stepped axial bore 73. This cavity serves the function of a head dam to prevent the extreme cold of the fluid passing through inlet flow aperture 18, outlet flow aperture 22 and fluid passageway 32, and radiating through sealing flanges 16, 21 ball valve 31, housing 11, mounting plate 60 from radiating into actuator housing 72 so as to influence the function of pinion 81 with its mating rack, as will presently appear.

A piston 100 is provided with rack teeth 101 which engage teeth 82 to drive pinion 81 and ball valve 33. Piston 100 is provided with axially located chambers 102, 103 connected by an axial passageway 104. Piston 100 is slidably mounted in horizontal bore 75. Check valves, generally indicated by reference numerals 105, 106 are slidably mounted in chambers 102, 103 respectively.

Check valve 105 comprises a piston 107 provided with a valve seat 108, an axial passageway 109, a chamber 110 and a hollow band 111. Fluid packing 112 may be located in hollow band 111. A detent 113 is slidably mounted in chamber 110. A coil spring 114 forces detent 113 into engagement with axial passageway 109. A snap ring 115 abuts the end of coil spring 114.

Check valve 106 comprises a piston 107A provided with a valve seat 108A, an axial passageway 109A, a chamber 110A and a hollow band 111A. Fluid packing 112A may be located in hollow band 11A. A detent 113A is slidably mounted in chamber 110A. A coil spring 114A forces detent 113A into engagement with axial passageway 109A. A snap ring 115A abuts the end of coil spring 114A.

Opposite ends of horizontal tubular shaped member 74 are provided with threads 120 and 121. Adjusting nuts or caps 122, 123 are rotatively mounted upon threads 120, 121, respectively.

Adjusting nut 122 is provided with an axial passageway 124 and a connection 125 adapted to receive an air line (not shown). The end 126 of axial passageway 124 is a valve face engaged by valve seat 108. A lock nut 127 rotatively mounted upon threads 120 forces a fluid tight packing ring 128 into engagement with adjusting nut 122 and adjustably secures adjusting nut 122 in selected position upon horizontal tubular shaped member 74.

Similarly, adjusting nut 123 is provided with an axial passageway 124A and a connection 125A adapted to receive an air line (not shown). The end 126A of axial passageway 124A is a valve face engaged by valve seat 108A. A lock nut 127A rotatively mounted upon threads 121 forces a fluid tight packing ring 128A into engagement with adjusting nut 123 and adjustably secures adjusting nut 123 in selected position upon horizontal tubular shaped member 74.

Figure 3:
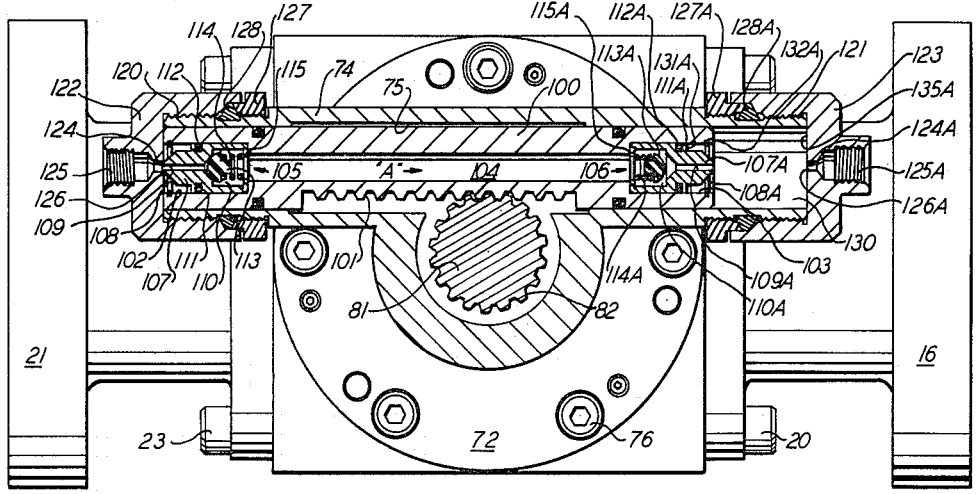
FIGURE 3 is a horizontal sectional view taken on line 3–3 of FIGURE 2.
Figure 4:
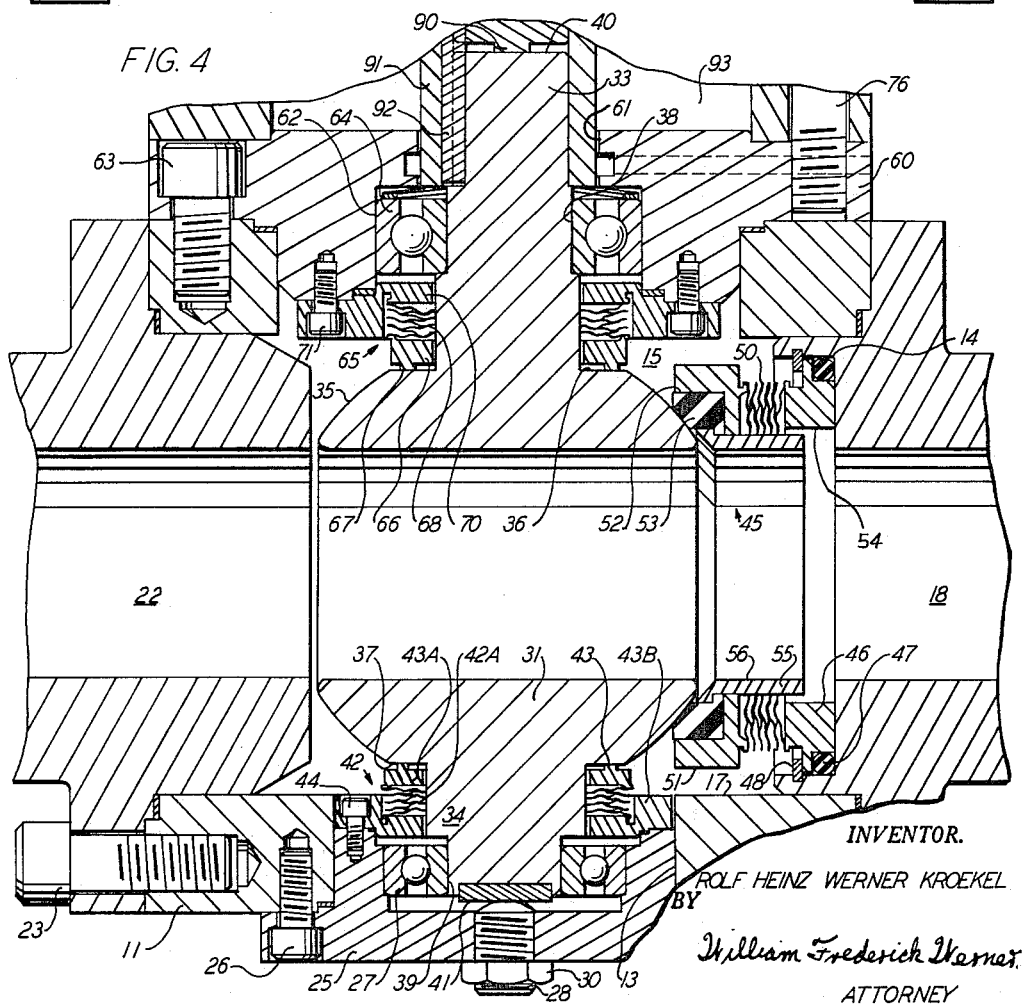
FIGURE 4 is an enlarged portion of FIGURE 2.

In operation, a source of air supply, under control of a four way valve (not shown) or a hydro-electric switch (not shown), will be connected to connection 125 and to connection 125A. FIGURES 3 and 4 illustrate the mechanism with the ball valve 31 in open position. That is fluid is permitted to pass through the ball valve 31. To rotate ball valve 31 into closed position, pressurized air will enter axial passageway 124 and pass into axial passageway 109 to push detent 113 against the tension of coil spring 114 and away from axial passageway 109. Thus permitting air to pass through chamber 110 and into axial passageway 104.

Simultaneously, during the cycle just described, air in chamber 130, a chamber formed in horizontal tubular shaped member 74 not occupied by piston 100 when ball valve 31 is in open position, is exhausted to the atmosphere, so that detent 113A under the influence of coil spring 114A moves from the position shown in FIGURE 3 to a position where detent 113A blocks axial passageway 109A.

Again, simultaneously, with the advent of pressurized air passing through axial passageway 124, piston 100 will move in the direction of arrow "A" and with the seating of detent 113A against axial passageway 109A, check valve 106 will move in the direction of piston 100 in relative movement therewith to project into chamber 130. Shoulder 131A on piston 107A will abut snap ring 132A fixed in chamber 103. Continued movement of piston 100 will cause valve seat 108A to engage end 126A of axial passageway 124A, whereby air is prevented from passing out of chamber 130. The air in chamber 130 builds up due to the movement of piston 100 into chamber 130 whereby the air forms a cushion or dash pot to prevent piston 100 from hitting wall 135A and jarring the mechanism. After piston 100 enters chamber 130 the four way valve or hydro-electric timing unit cuts off the source of air supply to axial passageway 124. At that point in the cycle the teeth 101 on piston 100 will have rotated pinion 81 through teeth 82 to turn ball valve 31 ninety degrees into closed position.

To open the valve the cycle just described is reversed with the pressurized air entering axial passageway 124A instead of axial passage way 124.

A feature of the present invention is the manner in which the pressure passing through the ball valve is utilized to balance the ball valve 31 and prevent the pressure from binding the ball valve in any given position. The structure created to balance ball valve 31 is upper fluid sealing seat 36 and lower fluid sealing seat 37 located diametrically opposite each other and of equal area. Circular projection 67 is provided with a diameter exactly equal to the diameter of circular projection 43. This equality of diameters would expose equal areas of ball valve 31 above and below a horizontal center line passing through fluid passageway 32 to fluid pressure. However, it is desirable to control the force with which ball valve 31 presses against ball valve adjusting screw 28 so that adjusting screw 28 may be used to push ball valve 31 upwardly for axial alignment of fluid passageway 32 with inlet flow aperture 18, outlet flow aperture 22 and fluid passageway 50. Therefore, the outside diameter of circular projection 67 is slightly smaller than the outside diameter of circular projection 43 so that a slightly greater area of upper fluid sealing seat 36 is exposed to fluid pressure over the area of lower fluid sealing seat 37. The difference in areas exposed to fluid pressure between upper and lower fluid sealing seats 36, 37 multiplied by the force of the pressure equals the force acting on ball valve 31 against ball valve adjusting screw 28.

Having shown and described a preferred embodiment of the present invention, by way of example, it should be realized that structural changes could be made and other examples given without departing from either the spirit or scope of this invention.

What I claim is:

1. A ball valve comprising a housing having a chamber with inlet and outlet flow apertures, a ball valve having a stem rotatively mounted in said housing, and located in said chamber and having an axial passageway connecting said inlet with said outlet flow apertures, an upper fluid sealing seat adjacent said stem at the top of said ball and a lower fluid sealing seat adjacent said stem at the bottom of said ball, a bellows type motion transmitting mechanism provided with an upper circular projection engageable with said upper fluid sealing seat fixed in said housing, another bellows type motion transmitting mechanism, provided with a lower circular projection engageable with said lower fluid sealing seat, fixed in said housing, said upper fluid sealing seat and said lower fluid sealing seat having equal areas, said upper circular projection and said lower circular projection varying in outside diameters to expose an area of said upper fluid sealing seat different from the exposed area of said lower fluid sealing seat, to fluid in said chamber.

2. A ball valve comprising a housing having a horizontal tubular shaped member provided with a bore and hydraulic means for actuating a ball valve, said hydraulic means including a piston having rack teeth, a pinion having teeth rotatively mounted in said housing and engaging said rack teeth, said housing having a chamber provided with an inlet flow aperture and an outlet flow aperture, a ball valve having an upper stem, and a lower stem in axial alignment with said upper stem, the teeth of said pinion lying in a plane parallel to the axis of said upper stem and lower stem, an axial passageway aligned with said inlet flow aperture and said outlet flow aperture, an upper sealing seat, a lower sealing seat and a conical seat, said upper sealing seat and said lower sealing seat having equal areas, said ball valve rotatively mounted in said housing by means of said upper stem and said lower stem, means connecting said upper stem with said pinion, a cavity formed in said housing at the juncture of said pinion with said upper stem providing a dam head against frigid temperatures radiating through said housing, a bellows type motion transmitting mechanism fixed in said housing and provided with an upper circular projection engageable with said upper fluid sealing seat, a second bellows type motion transmitting mechanism fixed in said housing and provided with a lower circular projection engageable with said lower fluid sealing seat, said lower circular projection being constructed and arranged to provide an exposed area of said lower fluid sealing seat different from that of said upper fluid sealing seat, a third bellows type motion transmitting mechanism fixed in said housing at said inlet flow aperture and provided with a resilient packing engageable with said conical seat and a fluid shield fixed in said housing and located in said inlet flow aperture and engaging said resilient packing to protect said third bellows type motion transmitting mechanism against fluid surges passing through said inlet flow aperture.

3. A ball valve comprising a housing having a horizontal tubular shaped member provided with a bore, and hydraulic means for actuating a ball valve, said hydraulic means including a first axial passageway having a first valve face located in one end of said horizontal tubular shaped member and in communication with said bore, a second axial passageway having a second valve face located in the other end of said horizontal tubular shaped member and in communication with said bore, a piston shorter in length than said bore and provided with rack teeth and an axial passageway aligned with said first axial passageway and said second axial passageway and reciprocatedly mounted in said bore, a first check valve slidably mounted in said axial passageway and engageable and disengageable with said first valve face, a second check valve slidably mounted in said axial passageway and engageable and disengageable with said second valve face, a dash pot formed alternately in said bore with the engagement of said first check valve with first valve face and with the engagement of said second check valve with said second valve face, a pinion having teeth rotatively mounted in said housing and engaging said rack teeth, said housing having a chamber provided with an inlet flow aperture and an outlet flow aperture, a ball valve having an upper stem, a lower stem in axial alignment with said upper stem, the teeth of said pinion lying in a plane parallel to the axis of said upper stem and lower stem, an axial passageway aligned with said inlet flow aperture and said outlet flow aperture, an upper sealing seat, a lower sealing seat and a conical seat, said upper sealing seat in vertical parallel relation and of equal area with said lower sealing seat to balance the fluid pressure on said ball valve, said ball valve rotatively mounted in said housing by means of said upper stem and said lower stem, means in said housing for vertically aligning said ball valve for horizontal alignment of said axial passageway with said inlet flow aperture and said outlet flow aperture, means connecting said upper stem with said pinion, a bellows type motion transmitting mechanism fixed in said housing and provided with an upper circular projection engageable with said upper fluid sealing seat, a second bellows type motion transmitting mechanism fixed in said housing and provided with a lower circular projection engageable with said lower fluid sealing seat, said lower circular projection being constructed and arranged to provide an exposed area of said lower fluid sealing seat different from that of said upper fluid sealing seat, and a third bellows type motion transmitting mechanism fixed in said housing at said inlet flow aperture and provided with a resilient packing engageable with said conical seat.

References Cited by the Examiner
UNITED STATES PATENTS

| | | | |
|---|---|---|---|
| 2,314,489 | 3/1943 | Fennema | 277—105 |
| 2,450,653 | 10/1948 | Galley | 91—347 |
| 2,805,040 | 9/1957 | Voss | 251—214 |
| 2,885,179 | 5/1959 | Hartmann | 251—315 |
| 2,963,260 | 12/1960 | Siravo | 251—58 XR |
| 2,963,262 | 12/1960 | Shafer | 251—172 |
| 3,042,358 | 7/1962 | Anderson | 251—172 |
| 3,151,837 | 10/1964 | Bentley-Leek | 251—214 |

MARTIN P. SCHWADRON, *Acting Primary Examiner.*

ISADOR WEIL, *Examiner.*